US012788086B2

(12) United States Patent
Mathew et al.

(10) Patent No.: US 12,788,086 B2
(45) Date of Patent: Nov. 10, 2026

(54) POLYMER SYSTEM COATING FOR ELASTOMERIC RUBBER GLOVES

(71) Applicant: YTY Industry Sdn Bhd, Kuala Lumpur (MY)

(72) Inventors: Monichan Puthuvelil Mathew, Kuala Lumpur (MY); Vikramjit Singh Hora, Singapore (SG)

(73) Assignee: YTY Industry Sdn Bhd, Kuala Lumpur (MY)

( * ) Notice: Subject to any disclaimer, the term of this patent is extended or adjusted under 35 U.S.C. 154(b) by 1194 days.

(21) Appl. No.: 16/464,914

(22) PCT Filed: May 27, 2019

(86) PCT No.: PCT/MY2019/050033

§ 371 (c)(1),
(2) Date: May 29, 2019

(87) PCT Pub. No.: WO2020/242286

PCT Pub. Date: Dec. 3, 2020

(65) Prior Publication Data

US 2021/0378333 A1 Dec. 9, 2021

(51) Int. Cl.
*A41D 19/00* (2006.01)
*B29D 99/00* (2010.01)
(Continued)

(52) U.S. Cl.
CPC ..... *A41D 19/0062* (2013.01); *B29D 99/0067* (2013.01); *C08J 7/0427* (2020.01);
(Continued)

(58) Field of Classification Search
CPC ........................ A41D 19/0058; A41D 19/0062
See application file for complete search history.

(56) References Cited

U.S. PATENT DOCUMENTS 4,857,565 A * 8/1989 Henning ............ C08G 18/0866 524/840
5,069,965 A * 12/1991 Esemplare ............... C08J 7/043 428/517
(Continued)

FOREIGN PATENT DOCUMENTS

CA 3141495 A1 12/2020
CN 113874427 A 12/2021
(Continued)

OTHER PUBLICATIONS

International Application Serial No. PCT/MY2019/050033, Preliminary Report on Patentability mailed Dec. 9, 2021, 7 pgs.
(Continued)

*Primary Examiner* — Vickey Nerangis
(74) *Attorney, Agent, or Firm* — Kwan & Olynick LLP

(57) ABSTRACT

Provided are various gloves and protective articles with improved donning characteristics. The glove includes an interior surface coated with a polymer system. The polymer system includes one or more first polymers, each including an average particle size between 100 nanometers (nm) to 400 nm. The polymer system further includes one or more second polymers, each including an average particle size in excess of 500 nm. The one or more first polymers may include a combination of one or more polymers including: butadiene based polymer and copolymer latices, isoprene based polymer and copolymer latices, copolymer latices prepared from styrene and acrylic monomers, and polyurethane copolymers. The one or more second polymers may include vinyl acetate polymers. The glove may be an elastomeric rubber glove coated with the polymer system in an amount between 0.0004 grams and 0.0016 grams on a dry basis.

13 Claims, 5 Drawing Sheets

(51) Int. Cl.

| | |
|---|---|
| ***C08J 7/04*** | (2020.01) |
| ***C09D 125/14*** | (2006.01) |
| ***C09D 147/00*** | (2006.01) |
| ***C09D 175/04*** | (2006.01) |

(52) U.S. Cl.
CPC ......... *C09D 125/14* (2013.01); *C09D 147/00* (2013.01); *C09D 175/04* (2013.01); *C08J 2409/10* (2013.01); *C08J 2425/14* (2013.01); *C08J 2447/00* (2013.01); *C08J 2475/04* (2013.01)

(56) References Cited

U.S. PATENT DOCUMENTS

| | | | |
|---|---|---|---|
| 5,084,514 A | 1/1992 | Szczechura et al. | |
| 5,088,125 A | 2/1992 | Ansell et al. | |
| 6,875,391 B2 * | 4/2005 | Modha | C08J 7/0427 264/307 |
| 2003/0175500 A1 * | 9/2003 | Mukherjee | C08J 7/043 428/323 |
| 2005/0019509 A1 | 1/2005 | Gardner et al. | |
| 2013/0225755 A1 | 8/2013 | Snow | |
| 2016/0272794 A1 | 9/2016 | Han et al. | |
| 2021/0378333 A1 | 12/2021 | Mathew et al. | |

FOREIGN PATENT DOCUMENTS

| | | |
|---|---|---|
| WO | 2017209596 A1 | 12/2017 |
| WO | 2020242286 A1 | 12/2020 |

OTHER PUBLICATIONS

International Application Serial No. PCT/MY2019/050033, Search Report and Written Opinion mailed Feb. 26, 2020. pp. 10.

Bill Howe et al., “New Technology for Latex Products Manufacturing Targeting Energy Conservation, Protein Reduction, and Improved Teaching,” 2007 International Latex Conference; Las Vegas, NV; Aug. 21-22, 2007, 31 pages Available at: http://www.rubbernews.com/assets/PDF/RN86500218.pdf [Accessed Feb. 6, 2020].

Güneri Akovali, Advances in Polymer Coated Textiles, 2012, Smithers Rapra Technology Ltd, 500 pages.

Examiner’s Report, Canadian Patent Application No. 3121495, Canadian Patent Office, mailed May 27, 2025, 3 pages.

Decision to Grant, EP Application No. 19930701.8, European Patent Office, mailed May 8, 2026, 2 pages.

* cited by examiner 1000X magnification of prior art coating before test (0 cycles)

1000X magnification of prior art coating following 60 cycles 1000X magnification of prior art coating following 300 cycles 1000X magnification of invention polymer system and coating before test (0 cycles)

1000X magnification of invention polymer system and coating following 60 cycles 1000X magnification of invention polymer system and coating following 300 cycles

POLYMER SYSTEM COATING FOR ELASTOMERIC RUBBER GLOVES

CROSS-REFERENCE TO RELATED APPLICATIONS

This application is a U.S. national application under 35 U.S.C. 371 of PCT Application no. PCT/MY2019/050033, entitled "POLYMER SYSTEM COATING FOR ELASTOMERIC RUBBER GLOVES", filed May 27, 2019, by Mathew et al., which is incorporated by reference in its entirety and for all purposes.

TECHNICAL FIELD

The present disclosure relates generally to elastomeric gloves, and more specifically to gloves for medical and industrial applications.

BACKGROUND

Elastomeric gloves, manufactured from natural and synthetic rubbers and other materials, are widely used in medical and industrial applications. To ensure good tactility the gloves must fit snuggly both on the fingers and the body of the hand. However, this snug fit makes donning of the gloves problematic, especially when a hand is damp. Common problems include increased time taken to don the glove and a poor final fit of the glove to the fingers, which may result in a loss of tactile control and poor hand hygiene behavior. In addition, gloves can be tom or otherwise damaged and loss of time in donning another glove in the event of a tear, in healthcare settings, can greatly impair the quality of the healthcare provided.

Glove manufacturers have attempted to address these problems by use of donning powders that lubricate the hand as it is inserted into the glove. But these powders are seen as the cause of other problems in the healthcare environment and so in the USA regulators have now banned their use. Glove manufacturers have also sought to improve glove donning by hardening the contact surface of rubber gloves using a process known as chlorination. Typically, chlorination levels of 400 to 1200 ppm (as based on free chlorine) are routinely used in the industry. This does improve the dry donning of a glove but has limited impact on the damp donning properties of the glove. Moreover, exposing a glove to such high levels of chlorination in process has additional disadvantages in that it fractures and weakens the glove surface, and the nature of the chemicals used can lead to corrosion and other issues within the glove manufacturing process.

There is therefore a need for improved elastomeric rubber gloves which are easy to don in both dry and wet conditions and can be produced powder free and with the minimal or no use of corrosive chlorination chemicals.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

In general, some embodiments of the present disclosure provide a glove with improved donning characteristics. The glove comprises an interior surface and a polymer system coating the interior surface. The polymer system comprises one or more first polymers, each of the first polymers including an average particle size between 100 nanometers (nm) to 400 nm, and one or more second polymers, each of the second polymer including an average particle size in excess of 500 nm.

The one or more first polymers may comprise at least one of: butadiene based polymer and copolymer latices, isoprene based polymer and copolymer latices, copolymer latices prepared from styrene and acrylic monomers, and polyurethane copolymers. The one or more second polymers may comprise vinyl acetate polymers. The polymer system may further comprise an inorganic granular particle with an average particle size in excess of 500 nm.

The polymer system may further comprise at least one of: alcohol ethoxylate surfactants, hydroxyethylcellulose, bronopol ($C_3H_6BrNO_4$), and a silicone type antifoam.

The interior surface may be non-chlorinated or exposed to chlorination levels under 600 parts per million (ppm). The polymer system may be applied to the interior surface by dipping the interior surface into a water-based dispersion of the polymer system. The polymer system may be blended into water at a weight percent of about 1.0% weight by weight (w/w) to 1.7% w/w along with a polyethylene glycol material at a concentration between about 0.10% to 0.30% w/w forming the water-based dispersion. The polymer system may be applied to the interior surface by spraying a water-based dispersion of the polymer system.

The glove may be an elastomeric rubber glove. The glove may comprise the polymer system in an amount between 0.0004 grams and 0.0016 grams on a dry basis. The interior surface may exhibit a wet coefficient of friction of less than 0.15. The polymer system may exhibit no delamination from the interior surface after at least sixty cycles of elongation and relaxation.

Other implementations of this disclosure include other wearable articles and methods corresponding to the described gloves and articles. These other implementations may each optionally include one or more of the following features. For instance, provided is a protective article comprising a first surface and a polymer system, as described, coating the first surface. The polymer system comprises one or more first polymers, each of the first polymers including an average particle size between 100 nanometers (nm) to 400 nm, and one or more second polymers, each of the second polymer including an average particle size in excess of 500 nm.

Also provided is a method comprising forming an elastomeric rubber glove on a mold. The method further comprises applying a polymer system onto an interior surface of the elastomeric rubber glove. The polymer system comprises one or more first polymers, each of the first polymers including an average particle size between 100 nanometers (nm) to 400 nm, and one or more second polymers, each of the second polymer including an average particle size in excess of 500 nm.

The one or more first polymers may comprise at least one of: butadiene based polymer and copolymer latices, isoprene based polymer and copolymer latices, copolymer latices prepared from styrene and acrylic monomers, and polyurethane copolymers. The one or more second polymers may comprise vinyl acetate polymers.

Applying the polymer system may comprise dipping the interior surface into a dilute aqueous dispersion of the polymer system. The polymer system may be blended into water at a weight percent of about 1.0% weight by weight (w/w) to 1.7% w/w along with a polyethylene glycol material at a concentration between about 0.10% to 0.30% w/w forming the dilute aqueous dispersion. Applying the polymer system may comprise spraying a dilute aqueous dispersion of the polymer system onto the interior surface.

The method may further comprise removing the elastomeric rubber glove from the mold before applying the polymer system, and applying the polymer system may comprise wet tumbling the elastomeric rubber glove in a dilute aqueous dispersion of the polymer system.

The method may further comprise chlorinating the interior surface before applying the polymer system onto the interior surface, such that the interior surface includes chlorination levels between 0 parts per million (ppm) and 600 ppm. The method may further comprise curing the elastomeric rubber glove before applying the polymer system onto the interior surface, and drying the elastomeric rubber glove after applying the polymer system onto the interior surface.

These and other embodiments are described further below.

DETAILED DESCRIPTION

Figure 1A:
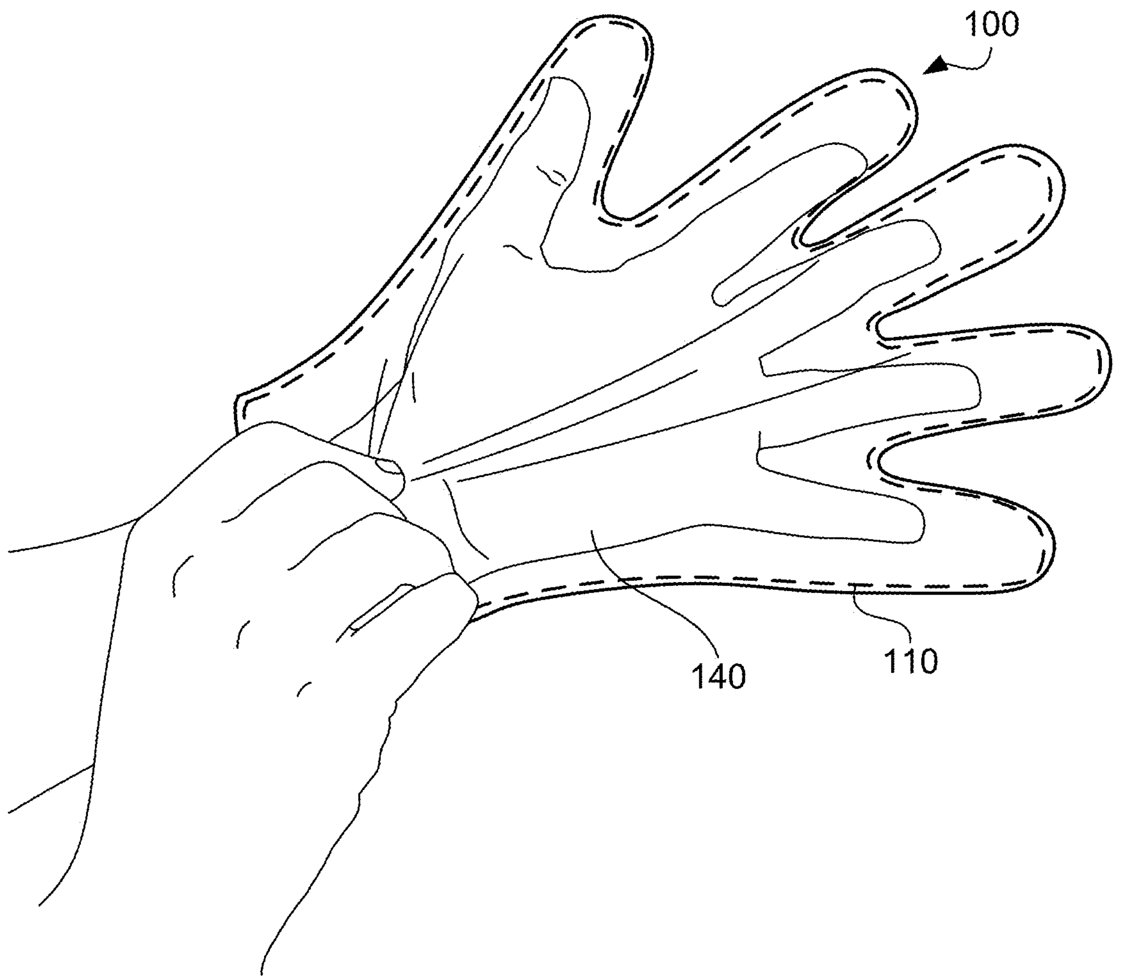
FIGS. 1A and 1B illustrate examples of wearable articles with a polymer system coating, in accordance with one or more embodiments.

Reference will now be made in detail to some specific examples of the disclosure including the best modes contemplated by the inventor for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the systems and methods of the present disclosure will be described in the context of particular materials. However, it should be noted that the structure and mechanisms of the present disclosure may describe of a variety and/or combination of different related and applicable elastomeric materials known in the art. As another example, the systems and methods of the present disclosure will be described in the context of nitrile rubber gloves. However, it should be understood that the systems and methods are applicable to various other elastomeric rubber articles that may be worn by users for various purposes.

In the following description, numerous specific details are set forth in order to provide a thorough understanding of the present disclosure. Particular example embodiments of the present disclosure may be implemented without some or all of these specific details. In other instances, well known structures, mechanisms, and materials have not been described in detail in order not to unnecessarily obscure the present disclosure.

Overview

Elastomeric gloves, manufactured from natural and synthetic rubbers and other materials, are widely used in medical and industrial applications. To ensure good tactility the gloves must fit snuggly both on the fingers and the body of the hand. However, this snug fit makes donning of the gloves problematic, especially when a hand is damp. The unmodified rubber surface of elastomeric gloves conforms to the micro surface of the skin and exacts a high grip and hence frictional forces as the glove user attempts to insert their hand. In a damp condition, this grip is enhanced as the wearer's skin is softer and also conforms to the rubber surface resulting in a more intimate contact and higher frictional forces.

Indeed, most users are often faced with the prospect of donning elastomeric gloves when their hands are damp. Within hospitals, this is generally because of the hand sanitization procedures that are required to be followed by a healthcare worker prior to donning a pair of examination gloves, which leave the hands damp. In Industrial applications, warm prevailing ambient temperatures, possible periods of rapid action on the part of the user, or a short transition period between donning one glove and donning the other all heighten the possibility of perspiration developing on a user's hands, resulting in damp hands when it is time to don the next pair of examination gloves.

When a user's hands are in a damp hand state, a number of issues in respect of donning examination gloves arise. In healthcare environments in particular, the user, knowing all of the existing issues involved in attempting to don examination gloves with damp hands, often rushes through the process, and ends up donning gloves in a sub-optimal manner, and with a sub-optimal form factor, which may result in a loss of tactile control and poor hand hygiene behavior. Even if a user is ultimately able to force-fit a glove over their damp hands, the resultant form factor is often sub-optimal due to air-pockets and other ill-fitting areas where the examination glove covers the skin. This risks impairing the effectiveness of the examination glove, particularly in high-stress environments, where the examination glove may be prone to rupturing.

The process of donning examination gloves when one has damp hands is also time consuming, as the gloves often bunch up, or stick, at a certain point. This then requires the user to adjust the gloves over the form factor of their hand, resulting in wasted time. As the hands are damp, the examination gloves often "stick" to the skin during the process of donning, and may result in the tearing or other damage to the glove, requiring the user to discard the damaged glove, and don another glove instead. This process results in additional time wasted and higher costs, as multiple gloves are unnecessarily used. In healthcare settings, such issues can greatly impair the quality of the healthcare provided.

Glove manufacturers have attempted to eliminate the problem by use of donning powders that lubricate the hand as it is inserted into the glove. But these powders are seen as the cause of other problems in the healthcare environment and so in the USA regulators have now banned their use. Glove manufacturers have also sought to improve glove donning by hardening the contact surface of rubber gloves using a process known as chlorination. Typically, chlorination levels of 400 to 1200 ppm (as based on free chlorine) are routinely used in the industry. While chlorination has been shown to improve the dry donning of a glove, it has limited impact on the donning properties of the glove in damp or wet conditions. Moreover, exposing a glove to such high levels of chlorination in process has additional disadvantages in that it fractures and weakens the glove surface, and the nature of the chemicals used can lead to corrosion and other issues within the glove manufacturing process. Thus, poorly managed chlorination processes can result in deleterious effects on the physical properties of the gloves, including decreased shelf life, decreased elasticity and decreased strength. Under these circumstances the gloves can also be difficult to don.

In other approaches, a polymeric coating may be applied to the interior surface of the glove during the glove manufacturing process. For example, a hydrogel polymeric coating formed from a variety of hydrophilic monomers features heavily in the prior art. Unfortunately, such polymers are routinely expensive to manufacture and provide further complexity to the glove manufacturing process through the need of additional crosslinking, chemical pre-treatment and rinsing steps and as such have not gained commercial viability for medical and industrial applications.

The general purpose of the present disclosure, which will be described subsequently in greater detail, is to provide a glove with improved donning characteristics in both dry and wet conditions. A novel formulation for a polymer system to coat elastomeric examination gloves is provided which comprises emulsion polymers including a combination of one or more polymer and/or monomer latices with an average particle size in the range of approximately 100 to 400 nanometers (nm), as well as a larger particle sized polymer with an average particle size in excess of 500 nm. The described formulations result in a coating with superior binding properties to elastomeric gloves while providing a heterogeneous surface morphology that minimizes points of contact with the skin to significantly reduce friction when donning.

As such, gloves coated with the novel polymer system allow the glove to be donned, or applied to the user's hand, quickly and conveniently in both wet and dry conditions while preventing damage and reducing donning time. Thus, in a medical healthcare environment, the described coating systems and gloves reduce usage costs from damaged gloves, enhance user productivity, increase safety through the proper fitting of examination gloves, and allow for improved compliance with hand-hygiene and safety protocols.

The disclosed gloves and coatings for such gloves also result in an improved elastomeric rubber glove that is produced powder-free. Such gloves also include minimal or no use of corrosive chlorination chemicals and instead rely on water-based polymeric coatings being applied directly to the elastomeric glove surface without pretreatment and additional complexity in manufacturing. The polymeric coating also does not separate and delaminate from the base elastomer of the glove when the glove is stretched.

Example Embodiments

A rubber surface, such as the inner surface, of the glove may be modified using the polymer systems described herein, which may be also referred to as a coating, to increase the surface hardness. As such, the ability of the surface to conform to and grip the skin is reduced. Simultaneously, the coating provides a surface topography that reduces the contact area between the glove surface and the skin of the wearer. This smaller contact area results in lower frictional forces that need to be overcome to don the glove.

Figure 1B:
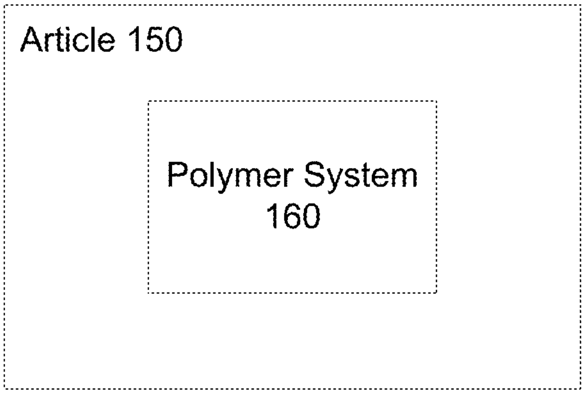

FIGS. 1A and 1B illustrate example wearable articles modified with a polymer system coating, in accordance with one or more embodiments. With reference to FIG. 1A, shown is glove 100 being donned on a user's hand 140. As depicted, glove 100 comprises polymer system 110 (shown in dashed lines) applied to the interior surface of glove 100 which contacts hand 140 of the user. In various embodiments, glove 100 is an elastomeric rubber glove. For example, glove 100 may be manufactured from a range of elastomers including, but not limited to natural rubber, carboxylated acrylonitrile butadiene rubber latex (nitrile), polychloroprene latex, styrene butadiene latices, acrylic latices, polyurethane dispersions and mixtures of the same using either a single or multiple coagulant dipping process as is understood by persons of ordinary skill in the art.

With reference to FIG. 1B, shown more generally is a wearable article 150 with polymer system 160. Such wearable article 150 may be a protective article, such as an elastomeric rubber article configured for various parts of a user's body, such as socks or foot coverings, arm or leg sleeves, etc. It should be recognized that the polymer system described herein may be implemented with various such elastomeric and rubber articles. In various embodiments, wearable article 150 comprises polymer system 160 applied to various surfaces of article 150. In particular, polymer system 160 may be applied to surfaces configured to contact a user's skin when applied or in operation, which is typically on the interior surface of article 150. Polymer systems 110 and 160, which may be implemented with various embodiments of the present disclosure, are further described below.

Specific selection of the described polymer systems achieves improved adhesion of the polymer system to the surface of the rubber glove with minimal chlorination or no chlorination beforehand. Coatings comprising the described polymer systems are also able to withstand elongation of the glove without showing signs of delamination.

The polymer system may comprise water-based emulsion polymers and a flexible binder or binding portion which may include a combination of one or more various polymers or monomers with an average particle size in the range of approximately 100 to 400 nanometers (nm). Such polymers may include, without limitation, butadiene, isoprene, styrene, acrylic, and polyurethane. In some embodiments, the polymers may comprise latices, such as butadiene based polymer and copolymer latices, isoprene based polymer and copolymer latices, copolymer latices prepared from styrene and acrylic monomers, polyurethane copolymers, as well as copolymers of vinyl acetate monomer.

In some embodiments, the polymer system further comprises a larger particle sized water-based polymer and/or inorganic granular particles with an average particle size in excess of 500 nm, such as vinyl acetate polymers or copolymers of vinyl acetate monomers. In various embodiments, one or more of the polymers described above may be water-based. In some embodiments, the average particle size may vary. However, in some embodiments, the actual size of the smaller particle-sized polymers are not smaller than 100 nm and do not exceed 400 nm. Similarly, in some embodiments, the size of the larger particle-sized polymers are greater than 500 nm.

The smaller particle-sized polymers may exhibit more elastomeric properties and enhance the binding of the polymer system to the surface of the glove. The presence of the larger particle-sized polymer increases the surface hardness of the coating and, in combination with the smaller particle-sized polymers, creates a heterogeneous surface morphology that minimizes points of contact with the skin to significantly reduce friction. Furthermore, under wet conditions, the heterogeneous surface morphology may also enhance the hydrophobic characteristics of the coated surface to limit how the water or moisture deposits and spreads over the surface by increasing the contact angle of water or moisture on the coated surface, thereby reducing the water area over the surface and limiting frictional force build up.

The polymer system may be applied to the non-chlorinated or lightly chlorinated interior surface of a rubber glove during its manufacture using coagulant dipping. For example, the surface of the glove may be exposed to chlorination levels between 0 parts per million (ppm) to 600 ppm, inclusive. However, in some embodiments, the surface of the glove may be exposed to chlorination levels above 600 ppm. For example, the surface of the glove may be exposed to chlorination levels of up to 1200 ppm in certain embodiments.

The polymer system can be most readily applied by dipping of the glove, while still on the glove mold, into a dilute aqueous dispersion of the polymer system. In certain embodiments, the dipping may be performed directly after curing of the glove and post cure leaching and prior to a final drying step, e.g., before the gloves are stripped from the molds and inverted during that same process. Alternatively, in some embodiments, the polymer system may be applied by spraying or other coating techniques at various stages of the coagulant dipping process or off line, such as by wet tumbling. For example, formed gloves may be removed from the molds, but not inverted such that the interior surface is exposed. The gloves may then be tumbled with a water-based dispersion of the polymer system until the interior surface is sufficiently coated with the polymer system. In some embodiments, the same or similar concentration of water-based dispersions of the polymer system may be used for the different application techniques. However, different suitable concentrations of such water-based dispersions may be used as required by the specific application technique.

In various embodiments, the amount of polymer system included ranges from between 0.0004 grams and 0.0016 grams per glove on a dry basis to prevent the inside of the glove having an undesirable shiny or wet appearance and associated adhesion problems. However, in various embodiments each glove may receive 0.0004 grams or below of the coating material (on a dry basis). In other embodiments, each glove may receive 0.0016 grams or more of the coating material (on a dry basis). If too little of the coating material is applied the glove donning properties may not be sufficiently improved. If excessive material is used the eventual interior surface of the glove becomes shiny and has tendency to stick to itself.

In various embodiments, polymer system 110 may be prepared from a water-based dispersion of an emulsion polymer with a higher particle size polymer material contained therein, at 20% total solids content. In example embodiments, the dilute aqueous dispersion comprises one or more of the following as flexible binder components with particle sizes ranging from approximately 100 nm to approximately 400 nm: butadiene and/or isoprene based polymer and copolymer latices, copolymer latices prepared from styrene and acrylic monomers, and a polyurethane dispersion. A larger particle-size materials with a particle size greater than 500 nm may also be included in the water-based dispersion. For example, the larger particle-sized material may include particle sizes of up to 1.0 microns or greater. In various embodiments, a polymer such as vinyl acetate and/or other inorganic granular particles such as silica dioxide or alumina may be implemented as the larger particle-sized material. Such inorganic granular particles may be added and dispersed in the water-based dispersion.

Other ingredients such as surfactants or biocides may optionally be added to the polymer system in some embodiments. Possible surfactants may include anionic and/or non-ionic surfactants, such as sodium lauryl sulfates and/or alcohol ethoxylate surfactants. The anionic and/or non-ionic surfactants may function to enhance coating stability in particular when elastomeric materials are added to the coating composition. In some embodiments, biocide is added to the polymer system to control the bioburden level. In particular embodiments, the biocide used can be bronopol ($C_3HBrNO_4$), or other similar biocides. In some embodiments, anti-foams such as silicone type antifoams may also be added to the polymer system. In some embodiments, suspension agents such as hydroxyethyl cellulose or polyethylene glycols may also be added to the polymer system.

Reduced Friction Characteristics

In example embodiments, the polymer system is blended into water at about 1.0% to 1.7% weight by weight (w/w) along with a polyethylene glycol material (such as that provided by SIGMA ALDRICH) at about 0.10% w/w to 0.30% w/w. Typical polyethylene glycols implemented in various embodiments improves the dispersion stability of the polymer system in water, and may include mono-functional or bi-functional materials and combinations therewith with molecular masses ranging from 400 to 20,000. Three example coating material formulations were prepared and tested, as further described in Table 1, which indicates the friction coefficients for each formulation as measured according to ASTM D1894 Standard Specification under dry conditions.

In Experiment 1, three different polymer system formulations were tested against a control formulation previously known in the art. In formulation 1, the described polymer system is blended into water at 1.0% w/w along with the polyethylene glycol material at 0.30% w/w. In formulation 2, the polymer system is blended into water at 1.5% w/w along with the polyethylene glycol material at 0.10% w/w. In formulation 3, the polymer system is blended into water at 1.7% w/w along with the polyethylene glycol material at 0.10% w/w (formulation 3). The control formulation comprised a water-based dispersion of an existing polymer system, POLYSLIP N130 supplied by Chempro Technology Sdn Bhd. The respective polymer systems were coated onto 3.5 gram (g) nitrile elastomeric gloves by dipping of the glove molds into a tank that was positioned after the post cure leaching stage of the normal glove manufacturing process and before a final drying step prior to the gloves being stripped from the molds. All gloves were chlorinated at levels of about 500 ppm during the manufacturing process.

TABLE 1

| Friction Coefficient of 3.5 g nitrile gloves as measured according to ASTM D1894 under dry conditions | | | | |
|---|---|---|---|---|
| | Control glove (control formulation) | Glove coated with Formulation 1 | Glove coated with Formulation 2 | Glove coated with Formulation 3 |
| Average Measured Static Friction Coefficient | 0.53 | 0.42 | 0.35 | 0.35 |
| % Reduction in Static Friction Coefficient compared to control | — | 21% | 34% | 34% |
| Average Measured Dynamic Friction Coefficient | 0.33 | 0.26 | 0.21 | 0.21 |
| % Reduction in Dynamic Friction Coefficient compared to control | — | 21% | 36% | 36% |

The results of shown in Table 1 were calculated from a mean of results from three sample tests (three gloves) for each formulation. As shown in Table 1, the polymer system of formulation 1 resulted in a 21% reduction in the average measured static friction coefficient compared to the control glove, and a 21% reduction in the average measured dynamic friction coefficient compared to the control glove. The polymer system of formulation 2 resulted in a 34% reduction the average measured static friction coefficient compared to the control glove, and a 36% reduction in the average measured dynamic friction coefficient compared to the control glove. The polymer system of formulation 3 resulted in a 34% reduction in the average measured static friction coefficient compared to the control glove, and a 36% reduction in the average measured dynamic friction coefficient compared to the control glove.

In Experiment 2, formulation 2 was further tested with 2.9 g nitrile gloves in both wet and dry conditions against a 2.9 g nitrile control glove. The test gloves were coated with formulation 2 and the control gloves were coated with the control formulation using the same coating process described in Experiment 1 above. Table 2 indicates the mean friction coefficients of three gloves for each of the formulations in Experiment 2 as measured according to ASTM D1894 Standard Specification under both dry and wet conditions.

TABLE 2

| Friction Coefficient of 2.9 g nitrile gloves as measured according to ASTM D1894 under dry and wet conditions (Experiment 2) | | | | |
|---|---|---|---|---|
| | Dry condition: Average Measured Static Friction Coefficient | Dry condition: Average Measured Dynamic Friction Coefficient | Wet condition: Average Measured Static Friction Coefficient | Wet condition: Average Measured Dynamic Friction Coefficient |
| Control 2.9 g nitrile glove | 0.54 | 0.37 | 0.75 | 0.40 |
| Glove coated with Formulation 2 | 0.26 | 0.15 | 0.38 | 0.15 |
| % Reduction in Friction Coefficient compared to control | 52% | 59% | 49% | 63% |

As shown in Table 2, in Experiment 2, 2.9 g nitrile gloves coated with the polymer system of formulation 2 resulted in further reductions in static and dynamic friction coefficients in both dry and wet conditions.

When the described polymer system formulations were applied to gloves without chlorination, further reduction of measured friction was observed. Formulation 2 was further tested with chlorinated gloves in Experiment 3 (shown in Table 3) and Experiment 4 (shown in Table 4). In Experiments 3 and 4, the polymer system of formulation 2 was prepared as per Experiment 1, but prior to coating onto respective 3.5 g nitrile gloves, the gloves were subjected to chlorination levels of 0 ppm in Experiment 3 and 600 ppm in Experiment 4. The dipping conditions resulted in each glove receiving between 0.0004 grams and 0.0016 grams of the coating material (on a dry basis) per glove. However, in some embodiments, the glove may receive less than 0.0004 grams or more than 0.0016 grams of the coating material after application. Experiments 3 and 4 compared the respective test gloves to control 3.5 g nitrile gloves coated with the control formulation as per Experiment 1. Tables 3 and 4 indicate the average friction coefficients of the tested gloves calculated from three sample tests (three gloves) for each formulation, as measured according to ASTM D1894 Standard Specification under both dry and wet conditions.

TABLE 3

Friction Coefficient of 3.5 g nitrile gloves as measured according to ASTM D1894 under dry and wet conditions (Experiment 3)

| | Dry condition: Average Measured Static Friction Coefficient | Dry condition: Average Measured Dynamic Friction Coefficient | Wet condition: Average Measured Static Friction Coefficient | Wet condition: Average Measured Dynamic Friction Coefficient |
|---|---|---|---|---|
| Control 3.5 g nitrile glove | 0.57 | 0.44 | 0.75 | 0.37 |
| Glove coated pursuant to Experiment 3 | 0.26 | 0.03 | 0.38 | 0.14 |
| % Reduction in Friction Coefficient compared to control | 54% | 93% | 76% | 62% |

TABLE 4

Friction Coefficient of 3.5 g nitrile gloves as measured according to ASTM D1894 under dry and wet conditions (Experiment 4)

| | Dry condition: Average Measured Static Friction Coefficient | Dry condition: Average Measured Dynamic Friction Coefficient | Wet condition: Average Measured Static Friction Coefficient | Wet condition: Average Measured Dynamic Friction Coefficient |
|---|---|---|---|---|
| Control 3.5 g nitrile glove | 0.57 | 0.44 | 0.75 | 0.37 |
| Glove coated pursuant to Experiment 4 | 0.35 | 0.09 | 0.42 | 0.12 |
| % Reduction in Friction Coefficient compared to control | 39% | 80% | 73% | 67% |

As shown by Tables 3 and 4, gloves coated with the polymer system of formulation 2 without chlorination showed further reduction in friction in dry conditions, and comparable reductions in friction in wet conditions. Thus, the described polymer systems may be implemented with gloves without the need for chlorination during the manufacturing process, while providing similar or improved donning characteristics.

As previously described, donning of elastomeric gloves is problematic as the elastomer surface, such as that of an uncoated or untreated rubber glove, conforms to the micro surface of the skin and exacts a high grip, electric static charge, and high frictional forces as the glove user attempts to insert their hand. In wet conditions the electric static charge becomes more homogenously distributed leading to increased frictional forces. See M. M. Mahmoud, Frictional Behavior of Different Glove Materials Sliding Against Glass Sheet. Journal of Applied Sciences, 2016, 16: 491-495.5. By way of illustration, the control glove of Experiments 3 and 4 in Tables 3 and 4 resulted in a static friction coefficient of 0.57 in dry conditions and of 0.75 in wet conditions, and resulted in a dynamic friction coefficient of 0.44 in dry conditions and of 0.37 in wet conditions.

As shown by Experiments 1-4 above, the gloves treated with the polymer system demonstrate reduced coefficient of friction, as measured according to ASTM D1894 testing standards for Static and Kinetic Coefficient of Friction Tests of Plastic Film and Sheeting published by ASTM International as compared to a control glove coated with existing known formulations, as shown for Experiment 1 in Table 1 for 3.5 g nitrile gloves under dry conditions; for Experiment 2 in Table 2 for 2.9 g nitrile gloves under dry and wet conditions; and for experiments 2 and 4 in Tables 3 and 4 for 3.5 g nitrile gloves under wet and dry conditions.

The results presented within Tables 1-4 clearly demonstrate the benefit of utilizing the described polymer system. A marked reduction in friction of up to 93% under dry conditions and up to 76% under wet conditions in Experiment 3, which would translate to a significantly easier application for the user as they don such a glove. Most significant are the results under wet conditions.

In terms of donning gloves coated with the polymer system, friction is reduced due to the combination of the different sized polymers which provide a heterogeneous surface morphology that minimizes points of contact with the user's skin to reduce friction significantly compared to existing gloves and coatings. Such surface morphology further enhances the hydrophobic nature of the surface and reduces the water area on the surface and thereby reducing frictional force build up caused by moisture or water.

User Perception Study

To further elucidate on the benefits of the described polymer system, described herein are the results of a blind perception study. The scope of the study compared a control glove with gloves coated with polymer systems described herein (referred to herein as "test glove" or "coated glove") according to two following hand hygiene scenarios proposed by the World Health Organization: Scenario 1 involves washing hands with soap and water when visibly dirty or visibly soiled with blood or other body fluids or after using the toilet or during outbreaks of *Clostridium difficile*. Scenario 2 involves use of alcohol-based hand-rub as the preferred means for routine hand antisepsis in all other clinical situations: a) before and after touching the patient; b) before handling an invasive device for patient care, regardless of whether or not gloves are used: c) after contact with body fluids or excretions, mucous membranes, non-intact skin, or wound dressings; d) if moving from a contaminated body site to another body site during care of the same patient; e) after contact with inanimate surfaces and objects (including medical equipment) in the immediate vicinity of the patient; and f) after removing sterile or non-sterile gloves.

The 3.5 g test glove was coated with the polymer system of formulation 2 as per Experiment 1. The control glove comprised standard 3.5 g nitrile examination gloves coated with the control formulation as per Experiment 1. Targeted demographics of the respondents were selected to mirror the gender and profession ratio of hospitals in the United States, including 200 medical personnel consisting of doctors and nurses, each with a minimum of 2-3 years' of experience, which comprised 70% nurses and 30% doctors, and which comprised 77% women and 23% men.

The respondents were asked to don gloves in the following two scenarios: 1.) Water spray—gloves were donned immediately after water was applied to their left hand; and 2.) Alcohol rub—gloves were donned immediately after alcohol was applied to their left hand. Each respondent was to don one Test and one Control glove in each of the two scenarios. The actual timing of each glove don was recorded and the respondents was asked about their perceptions of their experience donning both Test and Control gloves in terms of i) speed, ii) ease, and iii) level of resistance in both scenarios.

The results of the study showed an actual time of donning the coated glove was reduced by close to 50%. As a whole, perceptions of the coated glove was better than the control glove in that 73.4% of respondents felt that the coated glove was faster to don, 70% of respondents felt that the coated glove was easier to don, and 71% of respondents experienced less resistance when donning the coated glove. Overall, perceptions and timing for donning the coated glove was viewed to be easier and better in the alcohol rub scenario as compared to the water spray scenario (i.e. lesser resistance).

With regards to the water spray scenario, donning the test glove was 7.6 seconds faster as compared to the control glove on average, and 85% of the respondents donned the test glove more quickly than the control glove. Over 70% of respondents reported a shorter perceived time to don the test glove, and nearly 20% of respondents reported that the control glove took longer to don. Over half the respondents perceived the test glove to be easier to don than a normal average glove, and close to 70% of the respondents perceived the test glove to be relatively easier to don than the control glove. More than 70% of respondents associated some or high resistance with the control glove, while over 70% of respondents experienced less resistance with the test glove as compared to the control glove.

With regards to the alcohol rub scenario, donning the test glove was 8.1 seconds faster as compared to the control glove on average, and almost 90% of respondents donned the test glove more quickly than the control glove. Over 80% of the respondents reported perceiving the test glove to be "fast" or "very fast" to don, and none rated the test glove as "very slow." Less than 5% of the respondents rated the test glove to be difficult to don, while about 40% of the respondents gave a "difficult" or "very difficult" rating to the control glove. Close to 70% of the respondents experienced some or high resistance with the control glove, while more than 90% of the respondents perceived the test glove to be either the same or better than the control glove in terms of lesser perceived resistance.

Enhanced Binding

As previously described, the described polymer systems also provide a flexible binding portion and which composition boosts adhesion to the interior surface of the glove preventing delamination. Experiments were conducted to compare 3.5 g gloves coated as per Experiment 1. As with Experiment 1, a test glove were coated with the polymer system formulation 2 and a control glove was coated with the control formulation (POLYSLIP N130), referred to herein as "control glove." Glove specimens were assessed utilizing a machine that was capable of applying repeated stretching (elongation and relaxation) cycles to a glove in a dry environment. Scanning electron microscope (SEM) imaging, as shown in FIGS. 2A-2C and 3A-3C, was used to visualize and detect disruption in surface morphology and the condition of the respective polymer system coating. In some embodiments, the gloves are elongated to the same length during each cycle by the machine. In the present test example, the tested gloves were stretched to approximately 19 centimeters (6.7 inches) during elongation. In other test examples, the gloves may be stretched between approximately 0.25 inches and 10 inches during the elongation. In some instances, the gloves may be tested by stretching beyond 10 inches during the elongation.

Figure 2A:
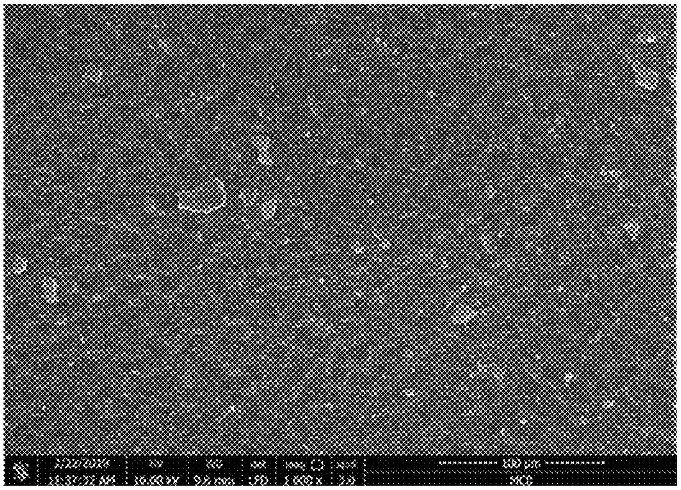
FIGS. 2A, 2B, and 2C illustrate magnified views of existing glove coatings after repeated cycles of elongation and relaxation.
Figure 2B:
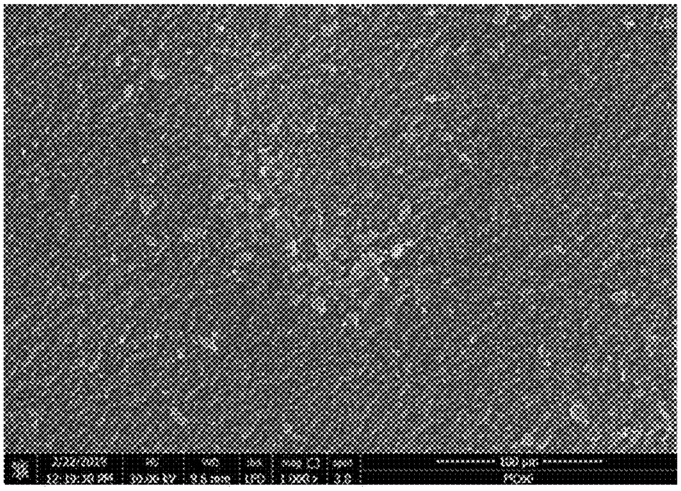
Figure 2C:
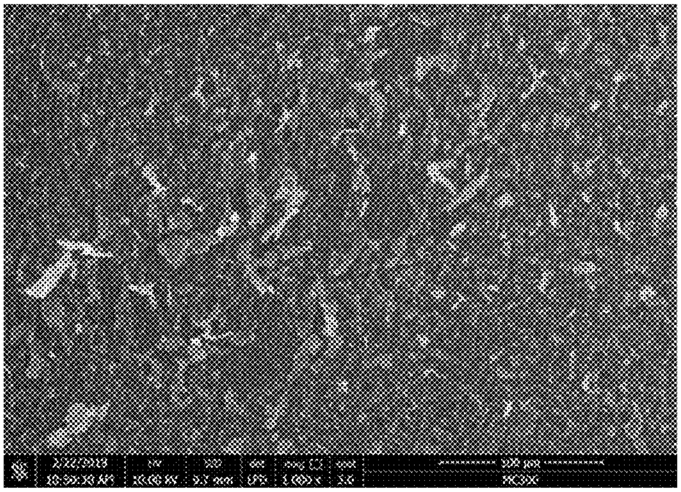

FIG. 2A shows a 1000× magnification of the coating of the control glove before testing (0 cycles). FIG. 2B shows a 1000× magnification of the coating of the prior art glove following 60 cycles of testing. FIG. 2C shows a 1000× magnification of the coating of the prior art glove following 300 cycles of testing. In comparing FIG. 2A to FIGS. 2B and 2C, it can be seen that after 60 cycles of repeated elongation and relaxation of the gloves, the prior art glove became noticeably flaky, and signs of delamination occurred as the number of elongation-relaxation cycles increased and the surface morphology was severely disrupted as shown by the SEM imaging in FIGS. 2A-2C.

Figure 3A:
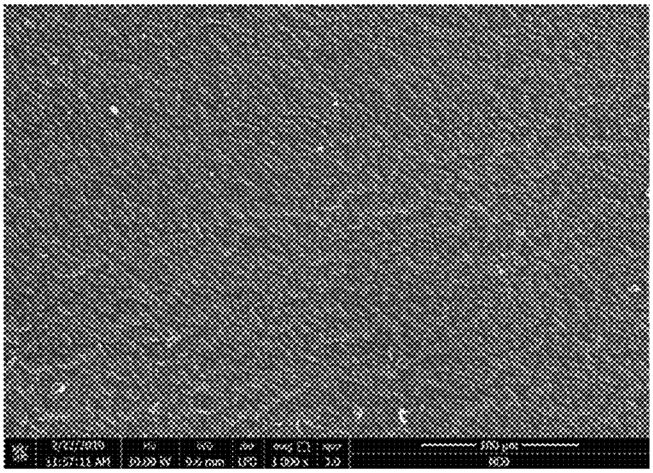
FIGS. 3A, 3B, and 3C illustrate magnified views of gloves coated with described polymer systems after repeated cycles of elongation and relaxation, in accordance with one or more embodiments.
Figure 3B:
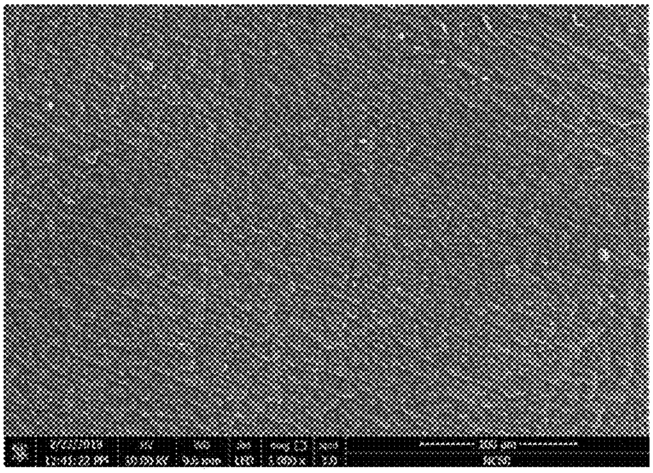
Figure 3C:
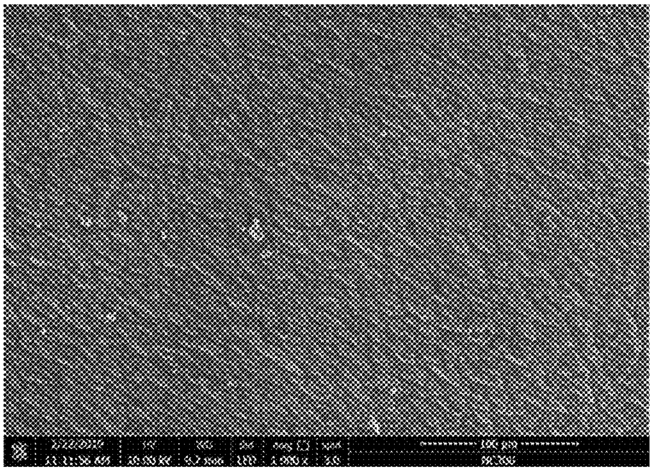

In contrast, FIGS. 3A-3C illustrate SEM imaging for the test glove coated with polymer system formulation 2. FIG. 3A shows a 1000× magnification of the coating of the glove coated with a polymer system before testing (0 cycles), in accordance with one or more embodiments. FIG. 3B shows a 1000× magnification of the coating of the glove coated with a polymer system following 60 cycles of testing, in accordance with one or more embodiments. FIG. 3C shows a 1000× magnification of the coating of the glove coated with a polymer system following 300 cycles of testing, in accordance with one or more embodiments. As can be seen in FIGS. 3A-3C, the polymer system and coating remained intact with no form of deterioration or delamination, or changes in surface morphology.

The described polymer system is superior to existing glove coatings in terms of delamination and donning. By preparing gloves with existing glove manufacturing processes and having the addition of the polymer system at the final stages (after the gloves have undergone chlorination and also leaching (washing), the polymer system is able to bind very strongly to the base elastomer, and prevent any delamination. Additionally, since the control coating (POLYSLIP N130) was also applied to the control glove in the same manner, the described polymer system must also inherently bond stronger as well. Thus, the described polymer system is well matched with the base elastomer, which is nitrile in this case.

Double Donning Pursuant to USP <800> Standards

It is becoming increasingly common for healthcare workers generally to wear a second pair of rubber gloves over a first pair (i.e. to double-don) because of increasing fears about the risk of infection during medical examination. The wearing of two pairs of gloves provides an added margin of safety. Indeed, the United States Pharmacopeia, will, implement stricter guidelines on handling hazardous drugs in a healthcare setting, known as USP <800>, by Dec. 1, 2019. The requirement will stipulate the need for double donning of gloves when handling hazardous drugs.

While double donning, the use of a second pair of gloves significantly increases the level of protection to the wearer and significantly reduces the risk of product contamination, double donning poses its own set of special practices and challenges, and not all disposable gloves are equal in their level of comfort when double donned, or in their ease of use during the double donning process. A high degree of friction between the outer surface of the first glove and the inner surface of the second glove may cause ripping or other damage, as well as increased frustration and preparation time due to difficulty in donning.

Damp donning is a common challenge faced by single-use glove wearers, as explained above. Whether moisture results from sweat, the use of isopropyl alcohol (IPA) spray or sanitizing solution, or work conducted in liquid solutions, double donning in damp conditions can prove exasperating. For individuals who must double don multiple times a day, it can be a source of significant daily aggravation and consume significant time during work hours.

Gloves coated with the described polymer systems further reduce surface friction to enable faster and more efficient double donning. In particular embodiments, gloves coated with the described polymer systems are able to be donned upon other such gloves or other existing gloves, such as standard nitrile gloves. In a blind test (Experiments 5 and 6) control gloves were compared with gloves coated with the described polymer systems (referred to herein as “test glove” or “coated glove”) for ease of double donning. The results of Experiment 5 and 6 demonstrate that test gloves coated with the described polymer systems were superior to control gloves in double donning applications.

In Experiments 5 and 6, coated glove A was tested against control glove A, and coated glove B was tested against control glove B. Coated glove A comprised a 2.9 g nitrile glove coated with the described polymer system formulation 2, and control glove A comprised a 2.9 g nitrile glove coated with the control formulation. Coated glove B comprised a 3.5 g nitrile glove coated with the described polymer system formulation 2, and control glove B comprised a 3.5 g nitrile glove coated with the control formulation. All gloves in Experiments 5 and 6 were coated as per Experiment 1. Seven tests were performed for each glove type. Test subjects were instructed to don a first glove and then don the same glove type over the first glove. For example, a test subject would have donned a first coated glove A, then donned a second coated glove A over the first. In each of Experiment 5 and 6, the first glove was donned on a dry hand.

In Experiment 5, the second glove is donned over the first glove in a dry condition. In Experiment 6, the second glove is donned over the first glove in a wet condition using the water spray technique as previously described with reference to the blind perception study above. The perceived ease of double donning was scored by the respondents as Level 1 (very easy to don), Level 2 (slightly easy to don), Level 3, moderate effort to don), or Level 4 (high effort to don).

TABLE 5

Double Donning Blind Test under dry conditions (Experiment 5)

| | Level 1 (very easy to don) | Level 2 (slightly easy to don) | Level 3 (moderate effort to don) | Level 4 (high effort to don) |
|---|---|---|---|---|
| Coated Glove A | 100 | 0 | 0 | 0 |
| Control Glove A | 29 | 71 | 0 | 0 |
| Coated Glove B | 100 | 0 | 0 | 0 |
| Control Glove B | 0 | 100 | 0 | 0 |

TABLE 6

Double Donning Blind Test under wet conditions (Experiment 6)

| | Level 1 (very easy to don) | Level 2 (slightly easy to don) | Level 3 (moderate effort to don) | Level 4 (high effort to don) |
|---|---|---|---|---|
| Coated Glove A | 100 | 0 | 0 | 0 |
| Control Glove A | 43 | 57 | 0 | 0 |
| Coated Glove B | 100 | 0 | 0 | 0 |
| Control Glove B | 29 | 57 | 14 | 0 |

As shown in Table 5, both coated glove A and coated glove B scored at Level 1 (very easy to don) in 100% of the trials under dry conditions. Whereas only 29%, of respondents scored control glove A as Level 1, and 71% of respondents scored control glove A as Level 2. In further comparison, 100% of respondents scored control glove B at Level 2. As shown in Table 6, both coated glove A and coated glove B scored at Level 1 (very easy to don) in 100% of the trials under wet conditions. Whereas most of the respondents (57%) scored control glove A as Level 2, and only 43% of respondents scored control glove A as Level 1. In further comparison, only 29% of respondents scored control glove B as Level 1, 57% scored control glove B as Level 2, and 14% of respondents scored control glove B as Level 3. Thus, under wet and dry conditions, the coated gloves were rated as very easy to don compared to the respective control gloves.

Method of Manufacture

Figure 4:
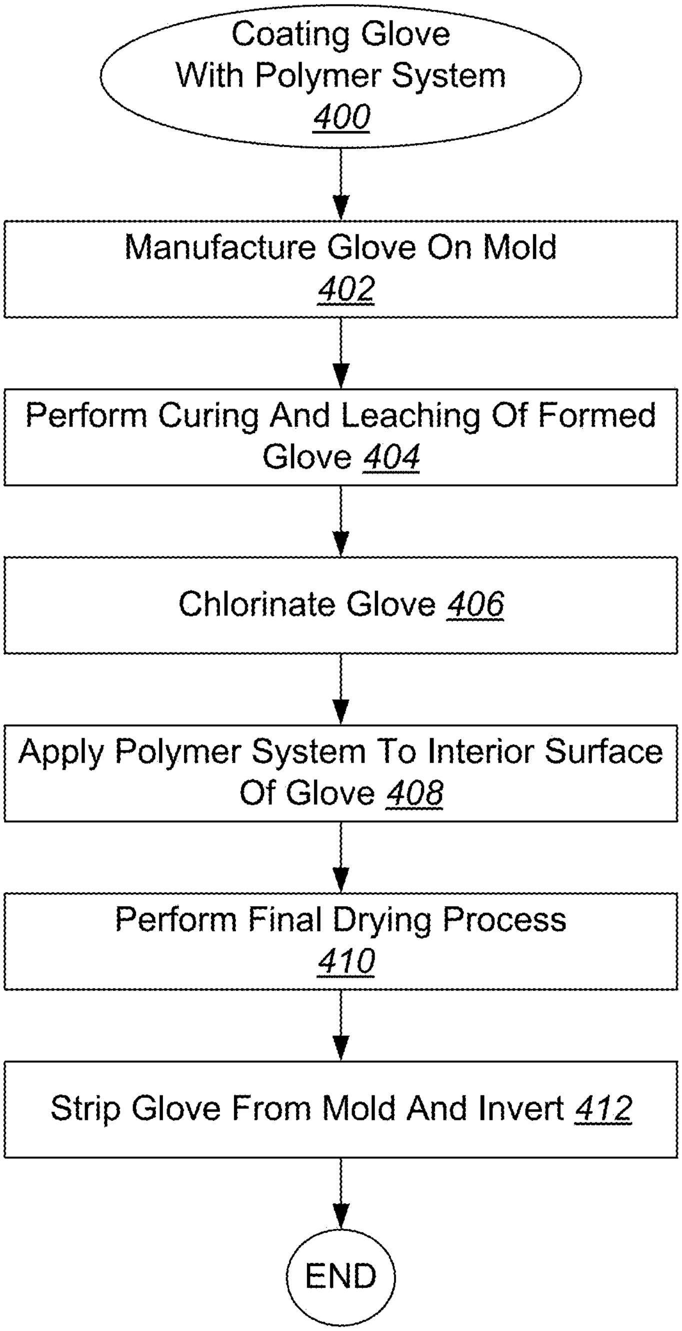
FIG. 4 illustrates an example method for coating a glove with a polymer system, in accordance with one or more embodiments.

With reference to FIG. 4, shown is an example method 400 for coating a glove with a polymer system, in accordance with one or more embodiments. At 402, a glove is manufactured on a mold or anatomic former. As previously described, an elastomeric rubber glove may be manufactured from various elastomers using various existing single or multiple coagulant dipping processes. Once the glove is formed by the manufacturing process of 402, the formed glove may be cured and leached at 404 to convert the glove into an elastic state and remove or minimize allergenic proteins and skin-sensitive chemicals. The processes of 404 may be performed by existing glove manufacturing processes which should be understood by persons of ordinary skill in the art.

In some embodiments, after post cure leaching in 404, the glove may be chlorinated at 406. In some embodiments, the interior surface of the glove includes chlorination levels of 0 ppm to 600 ppm. The polymer system is then applied to the interior surface of the glove at 408. In some embodiments, the polymer system is applied by dipping the interior surface into a dilute aqueous dispersion of the polymer system. Alternatively, and/or additionally, the polymer system is applied by spraying the polymer system onto the interior surface or by wet tumbling, as previously described. Subsequently, a final drying process is performed at 410, and the glove is stripped from the mold and inverted at 412.

Off line wet tumbling application of the polymer system may be performed after the glove has been removed from the mold, but not inverted, such that the interior surface remains exposed. The glove may then be placed into a tumble oven. The water-based dispersion may then be applied by a fine spray while the gloves are tumbled for up to 10 to 15 minutes. The gloves may then continue to be tumbled at a predetermined temperature (such as 70 degrees Celsius) to dry the applied polymer system coating. As another example, the glove may be placed into a large drum or barrel device with an appropriate quantity of the water-based dispersion. The drum is rolled to uniformly coat the gloves for up to 10 to 15 minutes. The gloves may then be removed and tumbled in an oven, such as a tumble oven at a predetermined temperature (such as 70 degrees Celsius) to dry the applied polymer system coating. After the wet tumbling process, the gloves are removed from the oven and inverted such that the exterior surface is exposed. In some embodiments, the polymer system may be applied by a combination of one or more of the application techniques described.

In some embodiments, chlorination of the glove at 406 may be an optional step, and application of the polymer system may be performed directly after curing of the glove and post cure leaching and prior to a final drying step (410). Alternatively, in some embodiments, the polymer system may be applied by spraying or other coating techniques at various stages of the coagulant dipping during the manufacturing process of 402.

CONCLUSION

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A glove comprising:

an interior surface; and a polymer system coating the interior surface, wherein the polymer system is blended into water at 1.0% to 1.7% weight by weight and a polyethylene glycol material at 0.10% to 0.30% weight by weight is blended into the water to provide a water-based dispersion of emulsion polymers, wherein the water-based dispersion of emulsion polymers is used to form a coating amount between 0.0004 grams and 0.0016 grams on the interior surface, wherein the interior surface is lightly chlorinated at levels up to 600 parts per million (ppm), wherein the polymer system comprises:

one or more first polymers, each of the one or more first polymers including an average particle size between 100 nanometers (nm) to 400 nm, and one or more second polymers, each of the one or more second polymers including an average particle size in excess of 500 nm.

2. The glove of claim 1, wherein the one or more first polymers comprises at least one of:

butadiene based polymer and copolymer latices, isoprene based polymer and copolymer latices, copolymer latices prepared from styrene and acrylic monomers, and polyurethane copolymers.

3. The glove of claim 1, wherein the one or more second polymers comprise vinyl acetate polymers.

4. The glove of claim 3, wherein the polymer system further comprises an inorganic granular particle with an average particle size in excess of 500 nm.

5. The glove of claim 1, wherein the polymer system further comprises at least one of:

alcohol ethoxylate surfactants, hydroxyethylcellulose, bronopol ($C_3H_6BrNO_4$), and a silicone antifoam.

6. The glove of claim 1, wherein the polymer system is applied to the interior surface by dipping the interior surface into a water-based dispersion of the polymer system.

7. The glove of claim 1, wherein the polymer system is applied to the interior surface by spraying a water-based dispersion of the polymer system.

8. The glove of claim 1, wherein the glove is an elastomeric rubber glove.

9. The glove of claim 1, wherein the interior surface exhibits a wet coefficient of friction of less than 0.15.

10. The glove of claim 1, wherein the polymer system exhibits no delamination from the interior surface after at least sixty cycles of elongation and relaxation.

11. A protective article comprising:

an interior surface; and a polymer system coating the interior surface, wherein the polymer system is blended into water at 1.0% to 1.7% weight by weight and a polyethylene glycol material at 0.10% to 0.30% weight by weight is blended into the water to provide a water-based dispersion of emulsion polymers, wherein the water-based dispersion of emulsion polymers is used to form a coating amount between 0.0004 grams and 0.0016 grams on the interior surface, wherein the interior surface is lightly chlorinated at levels up to 600 parts per million (ppm), wherein the polymer system comprises:

one or more first polymers, each of the one or more first polymers including an average particle size between 100 nanometers (nm) to 400 nm, and one or more second polymers, each of the one or more second polymers including an average particle size in excess of 500 nm.

12. The protective article of claim 11, wherein the one or more first polymers comprise at least one of:

butadiene based polymer and copolymer latices, isoprene based polymer and copolymer latices, copolymer latices prepared from styrene and acrylic monomers, and polyurethane copolymers; and wherein the one or more second polymers comprise vinyl acetate polymers.

13. The protective article of claim 12, wherein the polymer system further comprises an inorganic powder with an average particle size in excess of 500 nm.

* * * * *